US006403008B1

United States Patent
Schann

(10) Patent No.: US 6,403,008 B1
(45) Date of Patent: Jun. 11, 2002

(54) METHOD FOR OVERWELDING FILTER CASSETTES AND DEVICES PRODUCED THEREFROM

(75) Inventor: Christian Schann, Oberhausbergen (FR)

(73) Assignee: Millipore Corporation, Bedford, MA (US)

( * ) Notice: Subject to any disclaimer, the term of this patent is extended or adjusted under 35 U.S.C. 154(b) by 0 days.

(21) Appl. No.: 09/650,372

(22) Filed: Aug. 28, 2000

(30) Foreign Application Priority Data

Sep. 29, 1999 (EP) .............................. 99440261

(51) Int. Cl.[7] ........................ B29C 45/14; B29C 70/84; B01D 29/01
(52) U.S. Cl. ...................... 264/255; 29/525.01; 29/902; 156/60; 210/445; 264/262; 264/263; 264/DIG. 48
(58) Field of Search ................................ 264/255, 258, 264/262, 263, 266, 261, DIG. 48, 328.7; 210/445, 446, 450; 156/60; 29/525.01, 902

(56) References Cited

U.S. PATENT DOCUMENTS 4,113,627 A 9/1978 Leason
4,414,172 A * 11/1983 Leason ....................... 264/262
5,556,541 A * 9/1996 Ruschke

FOREIGN PATENT DOCUMENTS

| DE | 19631010 A1 | 2/1998 |
| GB | 2266477 A | 11/1993 |
| JP | 07314489 A | 4/1996 |

OTHER PUBLICATIONS

European Search Report, Place of Search: The Hague, Date of Completion of the Seardch: Mar. 9, 2000, Examiner: Alink, M.

* cited by examiner

Primary Examiner—Mathieu D. Vargot
(74) Attorney, Agent, or Firm—John Dana Hubbard; Paul J. Cook

(57) ABSTRACT

The present invention provides a filter cartridge or filter unit (11) produced by a thermoplastic overmolding process that allows for using a single mold for overmolding a variety of different sized filter elements (12) or membranes and a method for sealing or hermetically sealing Said filter element (12) in said filter unit (11) or cartridge. The proposed method produces a more robust filter unit (11) or cartridge than those provided by the prior art.

11 Claims, 4 Drawing Sheets

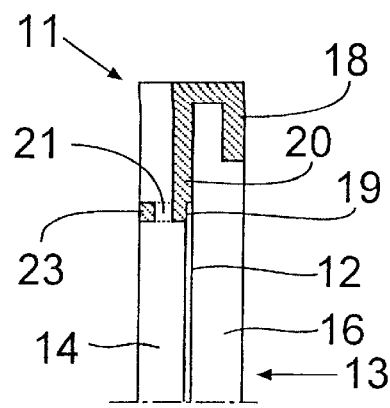
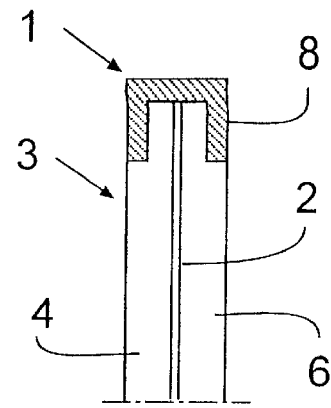
Fig. 2a  Fig. 2b
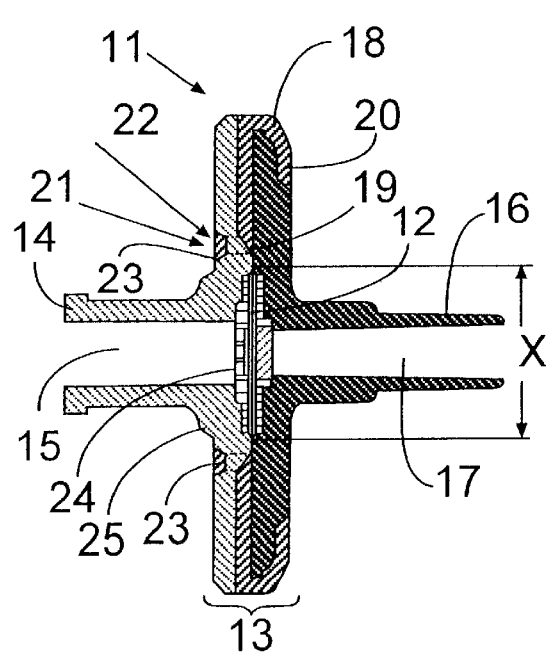
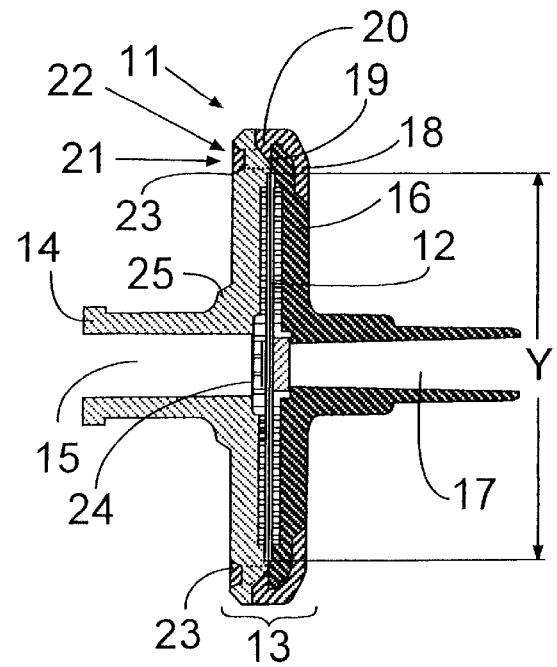
Fig. 3a  Fig. 3b

METHOD FOR OVERWELDING FILTER CASSETTES AND DEVICES PRODUCED THEREFROM

This invention relates to a method for sealing a filter element in a filter cartridge and filter devices produced therefrom.

Filter cartridges are used with a variety of types of filtration media, typically membranes for sterile filtration and sample preparation. The present invention provides an improved method for sealing a filter element in a filter cartridge by overmolding. The present method for overmolding filter cartridges results in a less expensive and improved filter cartridge.

One problem is that currently, a different sized filter cartridge overmold is needed for each different size of filter disk. Needing an overmold for each size of filter disk, in addition to the molds needed to create the two support halves of the filter cartridge, is expensive. Such overmolds are necessary because in the prior art devices the outer edge of the filter housing, the two support pieces being coupled with an overmold, is used, to secure the outer edge of the filter sheet to prevent leakage. Indeed, it follows that the prior art filter housing circumference had to be substantially equivalent to the circumference of the filter sheet or media.

For instance, U.S. Pat. No. 4,113,627 discloses a method for hermetically sealing a membrane in filter devices, e. g. filter cartridges. Specifically, it discloses a method comprising the steps of molding a thermoplastic filter support element which has the filtrate passing aperture formed therein, aligning the filter element over the aperture and the adjacent surface portions of the support, applying pressure to the filter element and the adjacent surface portions of the support to capture the edge of the filter element against the support and to form the integral seal between the support and the filter element.

In addition to the above mentioned problem, prior art filter cartridges may burst when subjected to significant pressure. Such bursting may be due to the failure to properly secure the support portions to each other. Such bursting may also be a result of the limitations of the prior art design of such filter cartridges.

The method of the present invention allows for a single overmold to be used to manufacture filter cartridges that can contain different diameters to filter disks. The present invention also provides an overmolding method that produces a complete filter cartridge that is less likely to burst under conditions that would make a prior art device burst.

The present invention provides a method for sealing a filter element In a filter cartridge or filter unit, comprising the steps of:

molding a thermoplastic support or housing in two parts, one first support part and one second support part for the filter element, each support part having at least one fluid flow passageway and said first support part having formed therein at least one overmold flow passageway, aligning the filter element between the first support part and the second support part of the thermoplastic support or housing so that the filter element covers the fluid flow passageway(s) and so that its periphery is adjacent to the overmold flow passageway(s) and adjacent to the surface portions of the two support parts of the support or housing, holding the filter element in position on the support or housing and, injection molding a compatible thermoplastic material that flows over at least a portion of the periphery of the filter element and through the overmold flow passageway(s) such that an integral sealing member between the two support parts of the support or housing and the filter element is formed.

The present invention also provides a method for hermetically sealing a filter element, the method comprising the steps of:

molding a thermoplastic support or housing for the filter element between two mold halves, said thermoplastic support or housing being realized as first and second support parts which respectively have at least one opening inlet and one opening outlet for the passage of a fluid and said support or housing having at least one aperture for the passage of an overmold material, removing one of the mold halves to expose the surface of the first support part on which the filter clement is to be located, aligning the filter clement so that it covers the at least one opening inlet and one opening outlet for the passage or a fluid, so that the filter element is adjacent to the surface portions of the first support part and the filter element's periphery is adjacent to the at least one overmold flow passageway, placing a new mold half containing the second support part over said first support part, the filter element and the remaining original mold half, the new mold half having to portions which contact and apply pressure to the filter element near the edge of the overmold flow passageway(s), the new mold half and the second support part forming a channel along the periphery of the filter element and a portion of the internal surface of the first support part in the first mold half, injection molding a compatible thermoplastic material into the channel that flows along the periphery of the filter element and against the internal surface of the first support part and through at the least one overmold aperture to the second support part to form an integral sealing member between the said two support parts, the filter element and the compatible thermoplastic material, and separating the mold halves and ejecting the complete support or housing and its integral filter element.

The present invention further provides a filter unit for removing contaminants from a fluid stream, comprising:

a thermoplastic support member or housing, a porous filter element and a thermoplastic overmold sealing member, said thermoplastic support member or housing being formed of a first support part and a second support part, each having at least one fluid flow passageway, and at least one thermoplastic overmold passageway, said filter element extending over said fluid flow passageway(s), its periphery adjacent to at least one thermoplastic overmold passageway and secured to said thermoplastic first and second support parts by said thermoplastic overmold sealing member also being disposed through the thermoplastic overmold passageway(s).

It is an object of the present invention to allow different diameter membranes to be molded into filter unit or cartridges using the same tool.

It is another object of the present invention to reduce the dead volume of filter unit (filter cartridges).

It is another object of the present invention to produce a filter unit or partridge that can withstand higher pressures than those currently available.

It is another object of the present invention to maintain the integrity loaf membranes (filter elements) used in filter units or cartridges by sealing them with a thermoplastic overmold rather than being pinched by a filter support or supports.

It is another object of the present invention to provide thermoplastic overmold passageways that allow the thermoplastic overmold material to flow over the periphery of the membrane and onto the support to provide improved pressure performance.

It is another object of the present invention to provide a membrane support design that assists in avoiding membrane obturation when a soft male luer part is connected to the cartridge or filter unit inlet.

It is another object of the present invention to have superior housing capability by reducing the flexion in comparison with the prior art.

It is another object of the present invention to reduce the cost of manufacturing as well as the time needed to manufacture.

The above gives a broad description of the present invention one preferred form of which will now be described with reference to the accompanying drawings in which:

FIGS. 2a and 2b illustrate two rough cross-sectional views comparing the present invention with the prior art;

FIGS. 3a and 3b illustrate two cross-sectional views of filter assemblies according to the present invention where filter elements or membranes having different diameters are used

Figure 1:
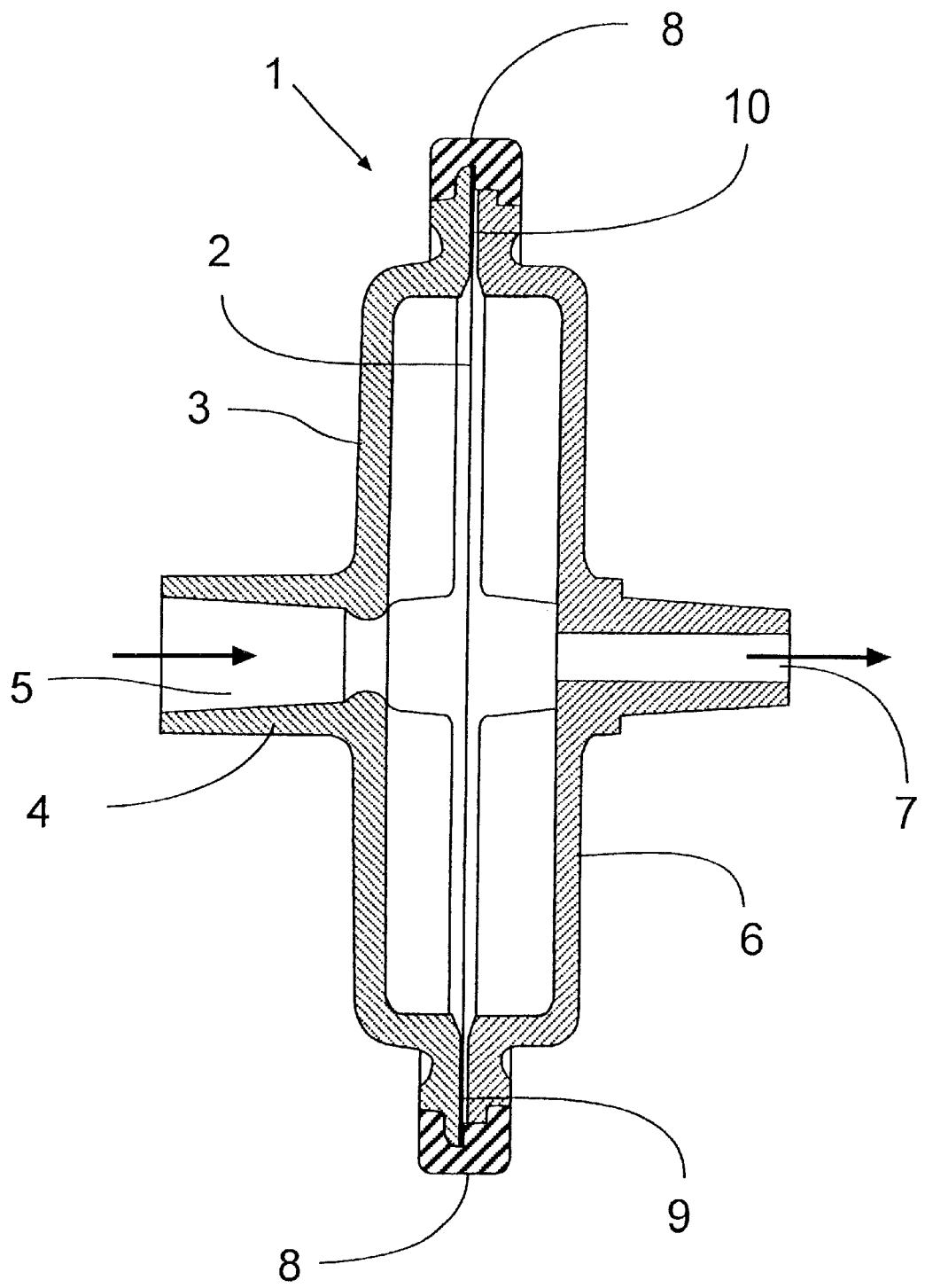
FIG. 1 is a cross section of a prior art filter unit or filter cartridges.

FIG. 1 shows a cross-section of a prior art filter unit 1. This filter unit 1 includes a filter element 2 disposed internally of a housing 3 with inlet and outlet openings 5 and 7 on two parts 4 and 6, respectively. These parts are assembled and fused or bonded into an integral filter unit 1 by means of an injection molded sealing member 8 of thermoplastic material. Sealing member 8 completely surrounds and fills joint 9 and thereby forms an integral part of the filter unit 1. In the represented embodiment one of the housing parts has a shortened exterior lip 10 such that at least a part of the lateral surface of filter element 2 will be directly exposed to the thermoplastic sealing member 8.

FIG. 2 illustrates the structural differences between the filter assembly (filter unit 11) according to the present invention (a) and the filter device 11 according to the prior art (b).

Figure 4A:
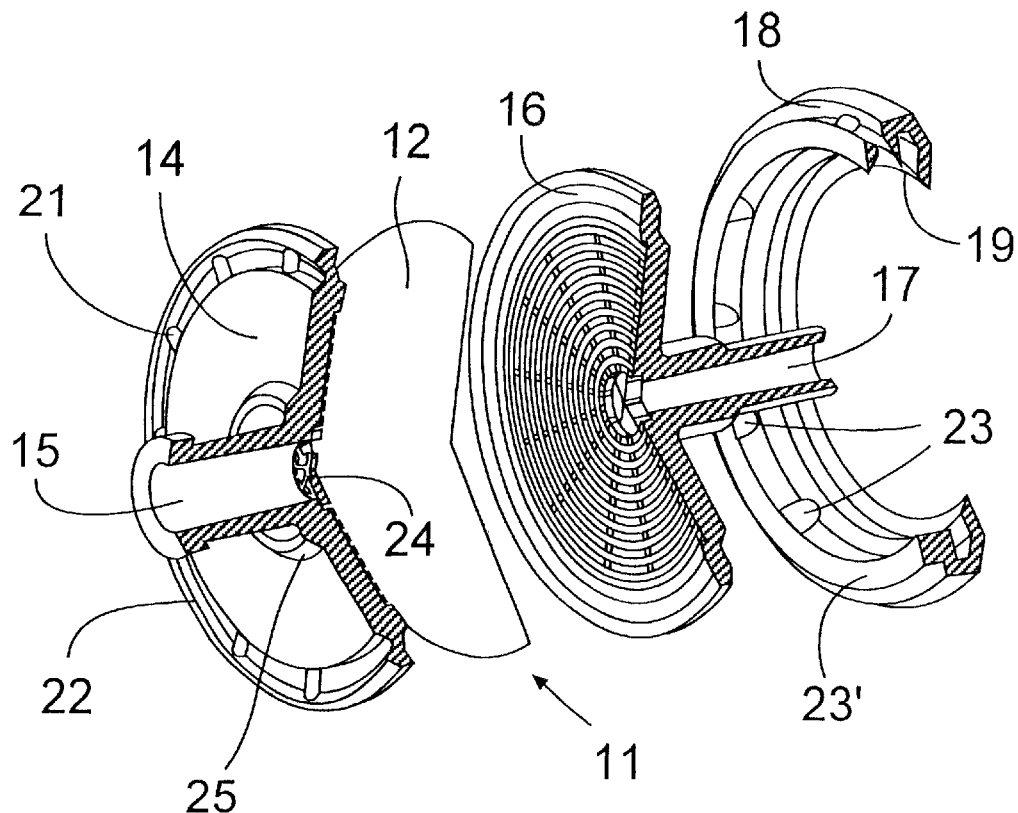
FIG. 4 illustrates an exploded view of a filter assembly according to the present invention.
Figure 4B:
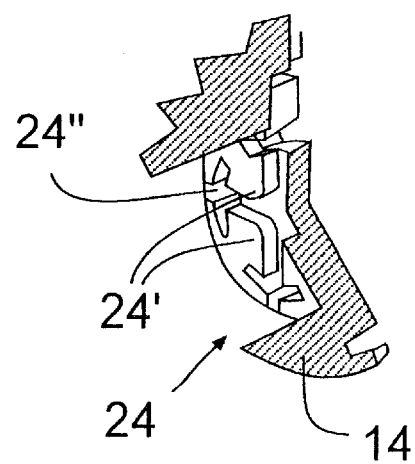
Figure 5:
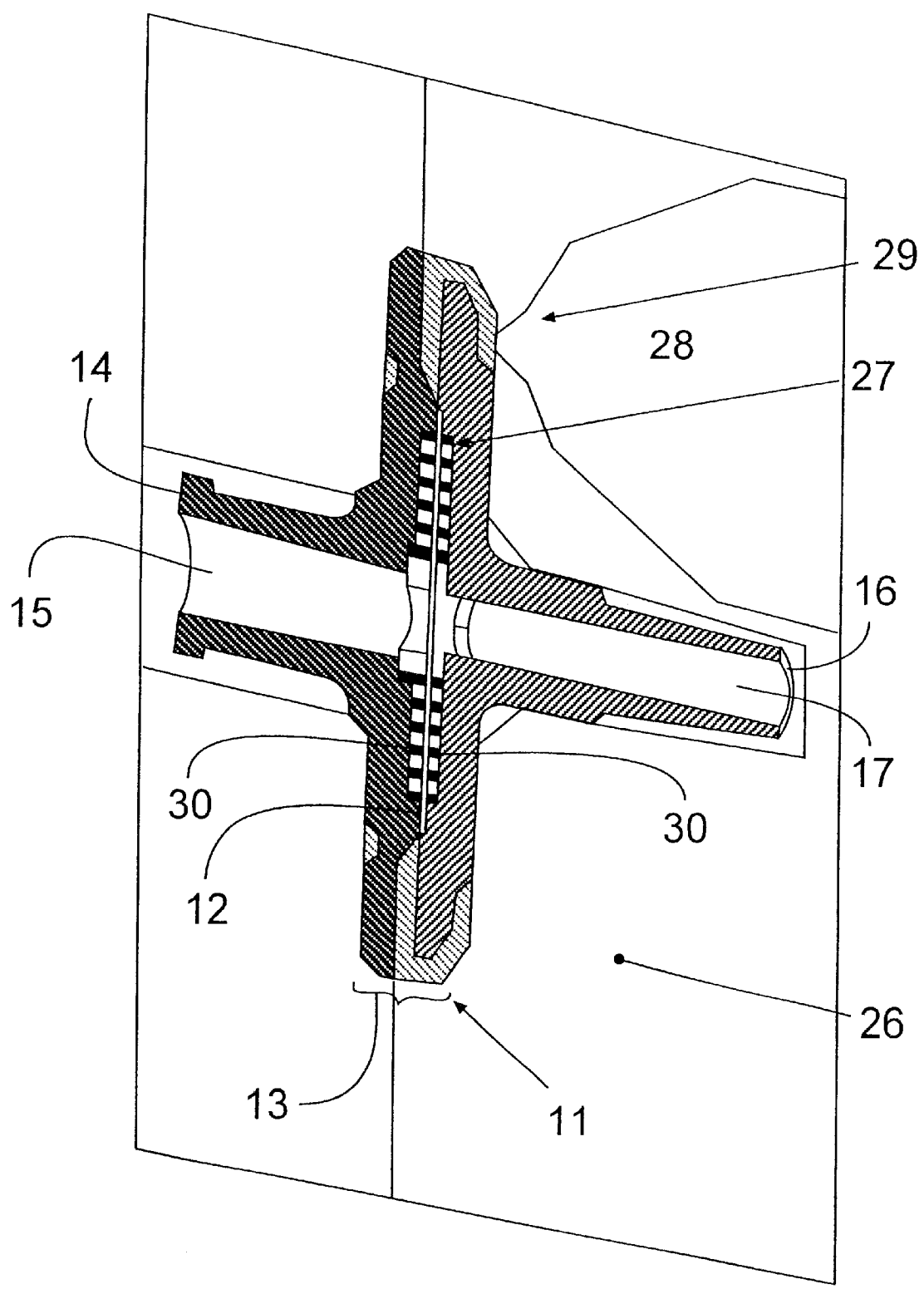
FIG. 5 illustrates the overmolding operation in the method of the present invention.

As seen on FIGS. 3, 4 and 5, the filter unit 11 according to present invention includes a filter element 12 disposed internally of a housing 13 with inlet and outlet openings 15 and 17 on a first support part 14 and a second support part 16, respectively. As shown on theses figures, the cross section of the inlet and outlet openings 15 and 17 on the first support part 14 and the second support part 16 are much smaller in comparison to the cross section of the filter element 12 thereby giving the filter unit 1 a characteristic shape. The support parts 14, 16 are assembled and fused or bonded into the integral filter unit 11 by means of an injection molded sealing member 18 of thermoplastic material.

As shown in detail on FIG. 2a, first support part 14 and second support part 16 form a housing 13 in a sandwich-like shape around the filter element 12. Both portions of said first and second support parts 14 and 16 are overmolded with an thermoplastic overmolding material to form a sealing member 18, which is very different to the prior art represented on FIG. 2b where the sealing member 8 merely joins the periphery of supports 10 and 12. In case of high pressure fluid flows applied to such a filter unit 1, the hazard of the sealing member 8 which acts like a clamp to be blasted off the supports 10 and 12 is not neglectible. This makes the prior art devices quite unreliable for high performance appliances where high pressure and flow rates are applied to the filter units 1.

In addition, this FIG. 2b clearly demonstrates that the filter 2 of the prior art device (filter unit 1) must have a diameter substantially similar to that of the parts 4 and 6. As FIG. 2a provides, in the present invention the diameter of the filter element 12 or membrane is independent of the diameter of first and second support parts 14 and 16. This is due to the overlap 19 of thermoplastic overmold that secures the filter element 12. This overlap 19 occurs because the first support part 14 has an overmold flow passageway 20 designed as a channel that allows the thermoplastic overmold material to flow between the first and second support parts 14 and 16 overt the filter element 12 to form an overlap 19 of overmold thermoplastic. The overmold thermoplastic then flows through at least one aperture 21 in the first support part 14 into an annular groove 22 such that pool 23' of overmold thermoplastic forms on the back side of the first support part 14 (FIGS. 3a and 3b). Upon solidifying, the aperture(s) 21 is (are) filled to form one or more rivets 23 and provide(s), along with the pool 23' of overmold thermoplastic, preferably in a circular shape, additional strength to the filter unit 11 (FIGS. 3a, b and 4). This construction allows the filter unit 11 or cartridge of the present invention to have a significantly higher burst pressure than those of the prior art.

FIG. 3 illustrates a comparison of the present invention where the filter element 12 has different diameters X or Y. The comparison demonstrates that the diameter of the first and second support parts 14 and 16 are independent of the diameter of the filter element 12. This means that only a single mold is needed for the overmolding process. FIG. 3 is also a sectional view of two embodiments of the present invention. Both recite the use of a fluid inlet aperture 15 and outlet aperture 17 to form a fluid flow passageway. They also recite the use of an anti-obturation plate 24. This structure of the anti-obturation plate 24 which is also partly shown on FIG. 4 allows the flow of fluid to be filtered by the filter element 12 but prevents la male luer fitting from pressing against the filter element 12. If this were, to occur, a substantial portion of said filter element 12 would be blocked and could not be used.

FIG. 4 provides an exploded view of a filter unit 11 (filter cartridges of the present invention. The supports 14 and 16 sandwich the filter element 12 (also referred to as the membrane), the <<sandwich>>) being held together by the thermoplastic overmold (sealing member 18). One particular aspect of the present invention illustrated by this FIG. is the rivet(s) 23 that reside(s) in the hole(s) 21 in the first support part 14.

Since the rivet(s) 23 is/are backed by the thermoplastic overmold, which has in this case a shape of a ring, the filter unit 11 or cartridge has substantially improved burst characteristics as compared with prior art devices.

FIG. 4 also provides another aspect of the present invention by the mean of a centering aid 25 that facilitates the use of the filter unit 11 in automated sample preparation processes. Indeed, as the present invention has de-coupled the need for circular supports, the present invention could utilize (circular filter elements 12 or membranes sandwiched between polygonal-shaped or more unconventionally-shaped first and second support parts 14, 16.

Polygonal first and second supports part 14, 16 and therefore filter units 11 or cartridges would be preferable as they are more easily handed by the various robotic automation systems that are in current favor. Polygonal filter units 11, i. e. square section shaped filter units may also be less bulky and thus easier and cheaper to store.

The present invention provides a method for sealing a filter element 12 in a filter unit 11 or cartridge comprising the steps of:

molding a thermoplastic support or housing 13 in two parts, a first support part 14 and a second support part 16 for the filter element 12, each support part 14, 16 having at least one fluid flow passageway and said first support part 14 having formed therein at least one overmold flow passageway 20, aligning the filter element 12 between the first support part 14 and second support part 16 of the thermoplastic support or housing 13 so that the filter element 12 covers the fluid flow passageway(s) and so that its periphery is adjacent to the overmold flow passageway(s) 20 and adjacent to the surface portions of the two support parts 14, 16 of the support or housing 13, holding the filter element 12 in position on the support or housing 13 and, injection molding a compatible thermoplastic material that flows over at least a portion of the periphery of the filter element 12 and through the overmold flow passageway(s) 20 such that an integral sealing member 18 between the two support parts 14, 16 of the support or housing 13 and the filter element 12 is formed.

The method of the present invention is characterized in that the peripheral surfaces of the first support part 14 and the second support part 16 adjacent the overmold flow passageway(s) 20 are shaped so that they may receive the thermoplastic material used in the overmolding step.

In one first embodiment the peripheral surfaces of the first 14 and second 16 support parts adjacent the overmold flow passageway(s) 20 are furrow-shaped to receive the thermoplastic material used in the overmolding step.

In a second embodiment (non represented) one of the support parts 14, 16 is cup-shaped whereas the other corresponding support part 14, 16 is realized as a cover resting on said cup, the peripheral surfaces adjacent the overmold flow passageway(s) 20 being assembled by the thermoplastic material used in the overmolding step. The two support parts 14, 16 forming the covered cup shaped housing 13 may also be provided with supplementary bonding means in order to be assembled together before the thermoplastic material is injected in the formed housing 13 during the overmolding step.

For example, the two first 14 and second 16 support parts forming the covered cup may be screwed, glued or welted together before the thermoplastic material is injected in the formed housing 13 through the existing overmold flow passageway(s) 20 during the overmolding step.

According to another embodiment the present invention provide a method for hermetically sealing a filter element 12, the method comprising the steps of:

molding a thermoplastic support or housing 13 for the filter element 12 between two mold halves, said thermoplastic support or housing 13 being realized as first 14 and second 16 support parts which respectively have at least one opening inlet 15 and one opening outlet 17 for the passage of a fluid and said support or housing 13 having at least one aperture 21 for the passage of an overmold material, removing one of the mold halves to expose the surface of the first support part 14 on which the filter clement 12 is to be located, aligning the filter element 12 so that it covers the at least one opening inlet 15 and one opening outlet 17 for the passage of a fluid, so that the filter element 12 is adjacent to the surface portions of the first support part 14 and the filter element's 12 periphery is adjacent to the at least one overmold flow passageway 20, placing a new mold half containing the second support part 16 over said first support part 14, the filter element 12 and the remaining original mold half, the new mold half having portions which contact and apply pressure to the filter element 12 near the edge of the overmold flow passageway(s) 20, the new mold half and the second support part 16 forming a channel 20 along the periphery of the filter element 12 and a portion of the internal surface of the first support part 14 in the first mold half, injection molding a compatible thermoplastic material into the channel 20 that flows along the periphery of the filter element 12 and against the internal surface of the first support part 14 arid through the at least one overmold aperture 21 to the second support part 16 to form an integral sealing member 18 between the said two support parts 14 and 16, the filter element 12 and the compatible thermoplastic material, and separating the mold halves and ejecting the complete support or housing 13 and its integral filter element 12.

The present invention provides a filter unit 11 for removing contaminants from a fluid stream, comprising:

a thermoplastic support member or housing 13, a porous filter element 12 and a thermoplastic overmold sealing member 18, said thermoplastic support member or housing 13 being formed of a first support part 14 and a second support part 16, each having at least one fluid flow passageway, and at least one thermoplastic overmold flow passageway 20, said filter element 12 extending over said fluid flow passageway(s), its periphery adjacent to at least one thermoplastic overmold flow passageway 20 and secured to said thermoplastic first and second support parts 14, 16 by said thermoplastic overmold sealing member 18 also being disposed through the thermoplastic overmold flow passageway(s) 20.

In a special embodiment the filter unit 11 of the present invention further comprises means for minimizing obturation of the filter element 12 by male luer fittings, for example an anti-obturation plate 24.

In another special embodiment the filter unit 11 of the present invention further comprises means for centering said filter unit 11 when used in automated applications, for example a centering aid 25.

FIG. 5 is a graphic presentation of a filter unit 11 of the present invention as thermoplastic overmold material is injection-molded into two first and second support parts 14 and 16 forming the housing 13 of said filter unit 11 while residing in a mold 26. The filter element 12 or membrane is pinched between the first and second support parts 14 and 16 for a tight contact 27 and then the hot thermoplastic overmold material 28 is injected from injection gate 29. One or both of the housing 13 may also include a plurality of concentric ribs or rib-pieces 30 which are disposed inwardly of the outer portion of support parts 14 and 16 to provide an improved drain design for enhanced liquid repartition.

In an preferred embodiment, the thermoplastic overmold has a special color to indicate which type of filter is embedded in the manufactured filter unit 11, since the filter unit 11 cannot be dismantled once it has been formed and cooled.

The thermoplastic material used for the overmolding in the present invention and the operating conditions used for the overmolding process are those common to those skilled in the art. The thermoplastic material may, for example, be chosen from a wide range of plastics which are well known in the art, such as cellulose propionate, nylon, polyester, polypropylene, ABS, polyethylene, and vinyl among others.

Concerning the particular parameters and processing procedures utilized in the injection molding process, these may vary depending on the material and equipment and are also well known in the art. As a non-restrictive example where the housing 13 and sealing member 18 are composed of an ABS thermoplastic resin, a suitable injection temperature will be in the range of about 230° C. and the injection pressure will be approximately $10^7$ Pa.

Described herein above is a method or process for producing a filter unit 11 or cartridge, said method or process resulting in the decoupling of the shape and size of the filter element 12 or membrane with the shape and size of the two support parts 14 and 16 forming the housing 13 in which it is to be overmolded.

The process also produces a filter unit 11 or cartridge having superior bursting characteristics. In this disclosure, there is shown and described only the preferred embodiment of the invention. However, it is to be understood that the invention is capable of use in various other combinations and environments and is capable of changes or modifications within the scope of the invention concept as expressed herein.

What is claimed is:

1. Method for sealing a filter element in a filter unit or cartridge comprising the steps of:

molding a thermoplastic support or housing in two parts, one first support part and one second support part for the filter element, each support part having at least one fluid flow passageway and at least the first support part having formed therein at least one overmold flow passageway, aligning the filter element between the first support part and the second support part of the thermoplastic support or housing so that the filter element covers the fluid flow passageway(s) and so that its periphery is adjacent to the at least one overmold flow passageway and adjacent to surface portions of the two support parts of the support or housing, holding the filter element in position on the support or housing and, injection molding a compatible thermoplastic material that flows over at least a portion of the periphery of the filter element and through the at least one overmold flow passageway such that an integral sealing member between the two support parts of the support or housing and the filter element is formed.

2. Method according to claim 1, characterized in that the peripheral surfaces of the first support part and the second support part adjacent the at least one overmold flow passageway are shaped so that they receive the thermoplastic material used in the injection molding step.

3. Method according to claim 2, characterized in that the peripheral surfaces of the first and second support parts adjacent the at least one overmold flow passageway are furrow-shaped to receive the thermoplastic material used in the injection molding step.

4. Method according to claim 2, characterized in that one of the support parts is cup shaped whereas the other corresponding support part is realized as a cover resting on said cup, the peripheral surfaces adjacent the at least one overmold flow passageway being assembled by the thermoplastic material used in the injection molding step.

5. Method according to claim 4, characterized in that the two support parts forming the covered cup shaped housing are also provided with supplementary bonding means in order to be assembled together before the thermoplastic material is injected in the formed housing during the injection molding step.

6. Method according to claim 5, characterized in that the both first and second support parts forming the covered cup are supplementary bonded by a bonding means selected from the group consisting of screws, glue or welds before the thermoplastic material is injected in the formed housing through the existing overmold flow passageway(s) during the injection molding step.

7. Method of hermetically sealing a filter element, the method comprising the steps of:

molding a thermoplastic support or housing for the filter element between two mold halves, said thermoplastic support or housing being realized as first and second support parts which respectively have at least one opening inlet and one opening outlet for the passage of a fluid and at least one of said support parts having at least one overmold flow passageway for the passage of an overmold material, removing one of the mold halves to expose the surface of the first support part on which the filter element is to be located, aligning the filter element so that it covers the at least one opening inlet and one opening outlet for the passage of a fluid, so that the filter element is adjacent to the surface portions of the first support part and the filter element's periphery is adjacent to the at least one overmold flow passageway, placing a new mold half containing the second support part over said first support part, the filter element and the remaining original mold half, the new mold half having portions which contact and apply pressure to the filter element near the edge of the at least one overmold flow passageway(s), the new mold half and the second support part forming a channel along the periphery of the filter element and a portion of the internal surface of the first support part in the first mold half, injection molding a compatible thermoplastic material into the at least one overmold flow passageway(s) that flows along the periphery of the filter element and against the internal surface of the first support part and through at least one overmold aperture formed in the first support part to form an integral sealing member between the said two support parts and the filter element and the compatible thermoplastic material, and separating the mold halves and ejecting the complete support or housing and its integral filter element.

8. Method according to claim 1 wherein the first support part contains the at least one overmold flow passageway.

9. Method according to claim 1 wherein the first and second support part each contains the at least one overmold flow passageway.

10. Method according to claim 7 wherein the first support part contains the at least one overmold flow passageway.

11. Method according to claim 7 wherein the first and second support part each contains the at least one overmold flow passageway.

* * * * *